US010356163B2

(12) United States Patent
Wang (10) Patent No.: US 10,356,163 B2
(45) Date of Patent: *Jul. 16, 2019

(54) METHOD AND COMMUNICATION SYSTEM FOR UNLOCKING USER DATA

(71) Applicant: Tencent Technology (Shenzhen) Company Limited, Shenzhen (CN)

(72) Inventor: Dong Wang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/672,057

(22) Filed: Aug. 8, 2017

(65) Prior Publication Data

US 2017/0339218 A1    Nov. 23, 2017

Related U.S. Application Data

(63) Continuation of application No. 14/260,020, filed on Apr. 23, 2014, now Pat. No. 9,762,656, which is a
(Continued)

(30) Foreign Application Priority Data

Dec. 11, 2012  (CN) .......................... 2012 1 0531510

(51) Int. Cl.
*A63F 13/75* (2014.01)
*H04L 29/08* (2006.01)
(Continued)

(52) U.S. Cl.
CPC ............. *H04L 67/10* (2013.01); *A63F 13/12* (2013.01); *A63F 13/45* (2014.09); *A63F 13/75* (2014.09);
(Continued)

(58) Field of Classification Search
CPC ............. G07F 17/3225; G07F 17/3239; G07F 17/323; G07F 17/3232; G07F 17/3237;
(Continued)

(56) References Cited

U.S. PATENT DOCUMENTS 6,264,560 B1   7/2001  Goldberg et al.
7,334,031 B2   2/2008  Royer et al.
(Continued)

FOREIGN PATENT DOCUMENTS

| CN | 101399695 A | 4/2009 |
|---|---|---|
| CN | 101425164 A | 5/2009 |
| CN | 101515935 A | 8/2009 |

OTHER PUBLICATIONS

Tencent Technology, ISRWO, PCT/CN2013/089059, Mar. 20, 2014, 7 pgs.
(Continued)

*Primary Examiner* — Omkar A Deodhar
*Assistant Examiner* — Ross A Williams
(74) *Attorney, Agent, or Firm* — Morgan, Lewis & Bockius LLP (57) ABSTRACT

A method at a server system includes: in response to a request for a user to enter a first information exchange hall, detecting a lock status of predefined information of an information exchange operation that is associated with the user and a second information hall; in accordance with a determination that an operation state of an information exchange operation that was executed at the second information exchange hall is a predefined inactive operation state: changing the lock status of the predefined information from the locked state to the unlocked state; and processing entry of the user into the first information exchange hall; and in accordance with a determination that the operation state of the information exchange operation is a predefined active
(Continued)

operation state, initiating a process to restore entry of the user into the second information exchange hall.

20 Claims, 7 Drawing Sheets

Related U.S. Application Data continuation of application No. PCT/CN2013/089059, filed on Dec. 11, 2013.

(51) Int. Cl.
*H04L 12/18* (2006.01)
*A63F 13/30* (2014.01)
*H04L 12/24* (2006.01)
*A63F 13/87* (2014.01)
*A63F 13/45* (2014.01)

(52) U.S. Cl.
CPC .......... *A63F 13/87* (2014.09); *H04L 12/1822* (2013.01); *H04L 41/024* (2013.01)

(58) Field of Classification Search
CPC ............. G07F 17/3227; H04L 12/1813; H04L 12/1818; H04L 12/1822; H04L 12/1831; A63F 13/73
USPC ...................................................... 463/40–42
See application file for complete search history.

(56) References Cited

U.S. PATENT DOCUMENTS

| | | |
|---|---|---|
| 8,070,583 B2 | 12/2011 | Baerlocker et al. |
| 8,291,481 B2 | 10/2012 | Das et al. |
| 8,721,431 B2 | 5/2014 | Kisenwether et al. |
| 9,177,445 B2 | 11/2015 | Vemuri et al. |
| 9,517,413 B1 | 12/2016 | Wickett et al. |
| 2005/0198379 A1 | 9/2005 | Panasyuk et al. |
| 2006/0089986 A1 | 4/2006 | Mendonca |
| 2006/0189382 A1 | 8/2006 | Muir et al. |
| 2007/0202941 A1 | 8/2007 | Miltenberger et al. |
| 2008/0034057 A1 | 2/2008 | Kumar et al. |
| 2008/0089308 A1 | 4/2008 | Jentz et al. |
| 2008/0091814 A1 | 4/2008 | Xie |
| 2009/0275393 A1 | 11/2009 | Kisenwether et al. |
| 2009/0328172 A1 | 12/2009 | Das et al. |
| 2010/0325420 A1 | 12/2010 | Kanekar |
| 2011/0105208 A1 | 5/2011 | Bickley |
| 2011/0269535 A1 | 11/2011 | Kelly et al. |
| 2012/0315981 A1 | 12/2012 | Gagner et al. |
| 2013/0109454 A1 | 5/2013 | Wilkinson et al. |

OTHER PUBLICATIONS

Tencent Technology, IPRP, PCT/CN2013/089059, Jun. 16, 2015, 5 pgs.

METHOD AND COMMUNICATION SYSTEM FOR UNLOCKING USER DATA

PRIORITY CLAIM AND RELATED APPLICATIONS

This application is a continuation application of U.S. patent application Ser. No. 14/260,020, filed Apr. 23, 2014, entitled "METHOD AND COMMUNICATION SYSTEM FOR UNLOCKING USER DATA", now U.S. Pat. No. 9,762,656, which is a continuation application of PCT Patent Application No. PCT/CN2013/089059, entitled "METHOD AND COMMUNICATION SYSTEM FOR UNLOCKING USER DATA" filed Dec. 11, 2013, which claims priority to Chinese Patent Application No. 201210531510.2, entitled "METHOD AND COMMUNICATION SYSTEM FOR UNLOCKING USER DATA," filed Dec. 11, 2012. All of the above applications are hereby incorporated by reference in their entireties.

FIELD OF THE INVENTION

The present application relates to the field of Internet technologies, and in particular, to a method and a communication system for unlocking user data.

BACKGROUND

With development and popularization of the Internet, the network information exchange operation has gradually become one of the main applications of the Internet, and more and more Internet users use the network information exchange operation.

The network information exchange operation is a massive multiplayer online information exchange operation (where the information exchange operation in the network may be specifically multiple players' operations in an online game, but is not limited to the example herein), may be an information exchange operation that supports instant communication, or may be an information exchange operation that supports common networks having no instant communication characteristics.

In the existing network information exchange operation, when a user performs the information exchange operation, he generally needs to first enter the information exchange hall, and finds an appropriate position in the information exchange hall and then executes the information exchange operation therebetween together with other users, and one information exchange hall usually can accommodate hundreds of users at the same time.

In the existing information exchange platform server, a user may simultaneously select multiple different information exchange halls, if the user enters another information exchange hall, modification to data of the user in other information exchange halls may cause abnormality of the data of the user in the current information exchange hall, and thus, in order to ensure unique modification to user data (for example, money, credit, experience), the information exchange platform server does not allow the user to enter multiple information exchange halls at the same time for some information exchange operations and scenes. The common practice is that, after a user enters a certain information exchange hall, data of the user may be locked, when the user intends to enter other information exchange halls at this time, it may be detected that the data of the user is locked, and at this time, the user may be prohibited from entering other information exchange halls.

However, in the existing practices, if the user needs to enter other information exchange halls, it is necessary for the user to first quit from the original information exchange hall, to be unlocked, however, once abnormality occurs, for example, system crash occurs in the user's client, at this time, the user cannot normally quit from the original information exchange hall, and cannot be normally unlocked, which may result in that the user cannot enter the information exchange hall to execute the normal information exchange operation due to data locking and not being unlocked normally, which finally may reduce the user experience.

SUMMARY

In accordance with some embodiments, a method at a server system includes: receiving a user request to enter a first information exchange hall; detecting a lock status of information of an information exchange operation associated with the user, where the information exchange operation is associated with a second information exchange hall; in accordance with a detection that the lock status is an unlocked state, processing entry of the user into the first information exchange hall; in accordance with a detection that the lock status is a locked state, determining an operation state of the information of the information exchange operation; in accordance with a determination that the operation state is an inactive operation state, changing the lock status of the information of the information exchange operation from the locked state to the unlocked state, and processing entry of the user into the first information exchange hall; and in accordance with a determination that the operation state is an active operation state, restoring entry of the user into the second information exchange hall.

In accordance with some embodiments, a server includes memory, one or more processors, and one or more programs, where the one or more programs are stored in the memory and configured to be executed by the one or more processors. The one or more programs including instructions for: receiving a user request to enter a first information exchange hall; detecting a lock status of information of an information exchange operation associated with the user, where the information exchange operation is associated with a second information exchange hall; in accordance with a detection that the lock status is an unlocked state, processing entry of the user into the first information exchange hall; in accordance with a detection that the lock status is a locked state, determining an operation state of the information of the information exchange operation; in accordance with a determination that the operation state is an inactive operation state, changing the lock status of the information of the information exchange operation from the locked state to the unlocked state, and processing entry of the user into the first information exchange hall; and in accordance with a determination that the operation state is an active operation state, restoring entry of the user into the second information exchange hall.

In accordance with some embodiments, a non-transitory computer readable storage medium storing one or more programs, the one or more programs comprising instructions, which when executed by a server, cause the device to: receive a user request to enter a first information exchange hall; detect a lock status of information of an information exchange operation associated with the user, where the information exchange operation is associated with a second information exchange hall; in accordance with a detection that the lock status is an unlocked state, process entry of the user into the first information exchange hall; in accordance with a detection that the lock status is a locked state, determine an operation state of the information of the information exchange operation; in accordance with a determination that the operation state is an inactive operation state, change the lock status of the information of the information exchange operation from the locked state to the unlocked state, and process entry of the user into the first information exchange hall; and in accordance with a determination that the operation state is an active operation state, restore entry of the user into the second information exchange hall.

BRIEF DESCRIPTION OF DRAWINGS

To illustrate the technical solutions according to the embodiments of the present application or in the prior art more clearly, the accompanying drawings for describing the embodiments or the prior art are introduced briefly in the following. Apparently, the accompanying drawings in the following description are only some embodiments of the present application; persons of ordinary skill in the art can obtain other drawings according to the accompanying drawings without paying any creative efforts.

DETAILED DESCRIPTION

Embodiments of the present application are described below in detail with reference to the accompanying drawings.

Figure 1:
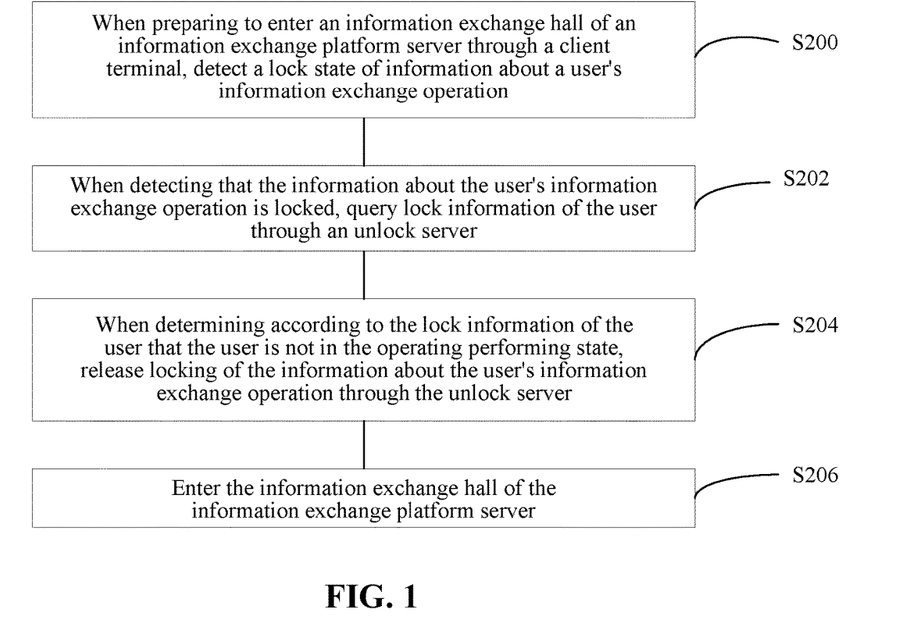
FIG. 1 is an overall flow chart of a method for unlocking user data according to an embodiment of the present application.

FIG. 1 is an overall flow chart of a method for unlocking user data according to an embodiment of the present application.

In this embodiment, a user logs on to an information exchange hall of an information exchange platform server through a client terminal to execute an information exchange operation. In this embodiment, the client terminal may be provided with information such as information exchange operation interfaces, information exchange login windows and information exchange settings, and then the user logs on to the information exchange platform server according to user account and password, to enter the information exchange hall. In this process, the information exchange platform server has acquired the user's any information that can validly identify his identity, including the user's instant communication number, nickname, credit and level data information; the information exchange platform server then sends information about the information exchange hall to the client terminal, and displays the information in the information exchange hall, and at this time, the user can freely choose to enter the information exchange hall to perform an operation-related information exchange operation. In an embodiment provided in the present application, including but not limited to, the information exchange platform server may be a game server, the executed information exchange may be a game operation, and the information exchange hall may be a game room provided by a game server.

After the user enters one information exchange hall, the information exchange platform server may lock information of the user's information exchange operation, and notify the client terminal that the information about the user's information exchange operation has been locked currently, definitely, at this time, the information exchange platform server and the client terminal may respectively store lock state information of the information about the user's information exchange operation.

In this embodiment, in step S200, when preparing to enter an information exchange hall of an information exchange platform server through a client terminal, detect a lock state of information about a user's information exchange operation. In this embodiment, it is feasible to query the lock state of the information about the current user's information exchange operation stored by the client terminal or to query the lock state of the information about the current user's information exchange operation stored by the information exchange platform server through the client terminal. In this embodiment, the lock state includes a locked state and a non-locked state (or idle NULL state).

In step S202, when detecting that the information about the user's information exchange operation is locked, query lock information of the user through an unlock server. In this embodiment, the lock information may include the information about the user's information exchange operation, and state information about an information exchange operation in the information exchange hall. In this embodiment, the state information about the information exchange operation includes an operation performing state (that is, performing the information exchange operation with another user), and a wandering state (or a bystander state, non-operating state or idle state).

In step S204, when determining according to the lock information of the user that the user is not in the operating performing state, release locking of the information about the user's information exchange operation through the unlock server. In this embodiment, the operation of releasing locking of the information about the user's information exchange operation may mean eliminating the user from the original information exchange hall in the information exchange platform server, thereby achieving releasing locking of information about the information exchange hall, credit information, experience information, and level data of the information exchange operation. Definitely, when it is determined according to the lock information of the user that the user is in the operation performing state of the information exchange operation, the operation of entering other information exchange halls may be canceled, that is, stop the operation of entering other information exchange halls, and the information exchange operation also can be continued by restoration to the information exchange hall of the original information exchange operation.

In step 206, enter the information exchange hall of the information exchange platform server. In this embodiment, when the locking of the information about the user's information exchange is released through the unlock server, it can be considered that, the user at this time has already quit from the locked information exchange hall, and can freely enter other information exchange halls.

With the technical solution provided in this embodiment of the present application, when the information about the user's information exchange is locked, locking of the information about the user's information exchange is released through an unlock server, so that it is unnecessary to execute the unlock operation through the client terminal itself, and the problem in the prior art can be avoided that the user cannot enter the information exchange hall as the client terminal cannot be normally unlocked due to occurrence of abnormality, thereby improving user experience of the information exchange operation.

Figure 2:
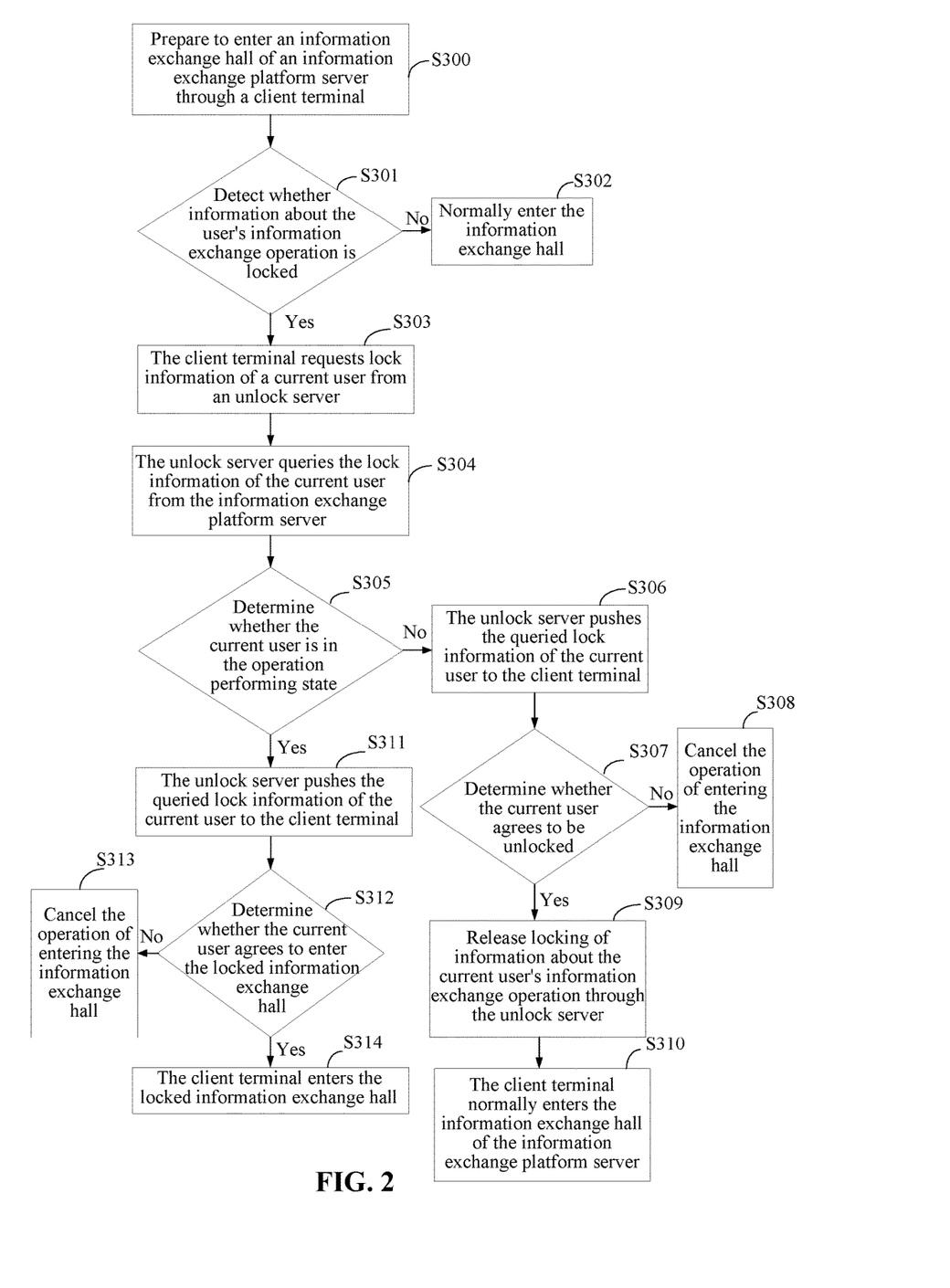
FIG. 2 is a specific flow chart of a method for unlocking user data according to an embodiment of the present application.

FIG. 2 is a specific flow chart of a method for unlocking user data according to an embodiment of the present application.

In this embodiment, in step S300, prepare to enter an information exchange hall of an information exchange platform server through a client terminal. In this embodiment, in actual operations, a user clicks an option of entering an information exchange hall provided by the client terminal, and the client terminal may display information indicating that the user is preparing to enter the information exchange hall.

In step S301, detect whether information about the user's information exchange operation is locked. In this embodiment, it is feasible to query the lock state of the information about the current user's information exchange operation stored by the client terminal or to query the lock state of the information about the current user's information exchange operation stored by the information exchange platform server through the client terminal. In this embodiment, the lock state includes a locked state and a non-locked state (or NULL).

In this embodiment, when detecting that the information about the user's information exchange operation is in the locked state, perform step S303; and when detecting that the information about the user's information exchange operation is in the non-locked state, perform step S302, and normally enter the information exchange hall.

In step S303, the client terminal requests lock information of a current user from an unlock server. In this embodiment, the client terminal may send a request message to the unlock server, to request lock information of the current user. Definitely, the request message may include the current user's account number or ID.

In step S304, the unlock server queries the lock information of the current user from the information exchange platform server. In this embodiment, the lock information may include the information about the user's information exchange operation, and state information about an information exchange operation in the information exchange hall. In this embodiment, the state information about the information exchange operation includes an operation performing state, and a wandering state (or a bystander state, non-operating state or idle state).

In step S305, the unlock server determines whether the current user is in the operation performing state according to lock information returned by the information exchange platform server. In this embodiment, when the unlock server determines that the current user is not in the operation performing state, perform step S306; and when the unlock server determines that the current user is in the operation performing state, perform step S311.

The following circumstances are respectively introduced below.

The first circumstance: in step S306, the unlock server pushes the queried lock information of the current user to the client terminal, and the lock information includes information indicating that the user is locked in the information exchange hall and information indicating that the user is not in the operation performing state. In this embodiment, when the client terminal receives the lock information of the current user pushed by the unlock server, it can be determined that the current user has been locked in the information exchange hall but is not in the operation performing state, it is necessary to further determine whether the current user agrees to be unlocked, and at this time, the current user can be inquired by displaying a prompt message.

In step S307, the client terminal determines whether the current user agrees to be unlocked. In this embodiment, if the current user disagrees to be unlocked, the user may click the corresponding DISAGREE option, the client terminal may receive a corresponding DISAGREE instruction, and at this time, the client terminal may determine that the current user disagrees to be unlocked, and perform step S308, that is, cancel the operation of entering the information exchange hall, and end the process of entering the information exchange hall; if the current user agrees to be unlocked, the user may click the corresponding AGREE option, the client terminal may receive a corresponding AGREE instruction, and at this time, the client terminal may determine that the current user agrees to be unlocked, and perform step S309.

In step S309, release locking of information about the current user's information exchange operation through the unlock server. In this embodiment, the operation of releasing locking of the information about the user's information exchange operation may mean eliminating the user from the original information exchange hall in the information exchange platform server, thereby achieving releasing locking of information about the information exchange hall, credit information, experience information, and level data of the information exchange operation. In this embodiment, when the client terminal determines that the current user agrees to be unlocked, the client terminal sends an instruction of agreeing to be unlocked to the unlock server, the unlock server sends an instruction of eliminating the information exchange hall of the current user to the information exchange platform server, the information exchange platform server releases locking of the information exchange hall of the current user, and as the locking of the information exchange hall of the current user has been released, the locking of the credit information, experience information and level data are also naturally released.

In step S310, the client terminal normally enters the information exchange hall of the information exchange platform server. In this embodiment, when the locking of the information about the user's information exchange operation is released through the unlock server, it can be considered that, the user at this time has already quit from the locked information exchange hall, and can freely enter other information exchange halls.

The second circumstance: in step S311, the unlock server pushes the queried lock information of the current user to the client terminal, and the lock information includes information indicating that the user is locked in the information exchange hall and information indicating that the user is in the operation performing state. In this embodiment, when the client terminal receives the lock information of the current user pushed by the unlock server, it can be determined that the current user has been locked in the information exchange hall and is in the operation performing state, at this time, the current player cannot request to be unlocked, either he is restored to the original information exchange hall to continue the information exchange operation or the operation of entering the information exchange hall is canceled. Thus, it is necessary to further determine whether the current user agrees to enter the locked information exchange hall, and at this time, the current user can be inquired by displaying a prompt message.

In step S312, the client terminal determines whether the current user agrees to enter the locked information exchange hall. In this embodiment, if the current user disagrees to enter the locked information exchange hall, the user may click the corresponding DISAGREE option, the client terminal may receive a corresponding DISAGREE instruction, and at this time, the client terminal may determine that the current user disagrees to enter the locked information exchange hall, and perform step S313, that is, cancel the operation of entering the information exchange hall, and end the process of entering the information exchange hall; if the current user agrees to enter the locked information exchange hall, the user may click the corresponding AGREE option, the client terminal may receive a corresponding AGREE instruction, and at this time, the client terminal may determine that the current user agrees to enter the locked information exchange hall, and perform step S314.

In step S314, the client terminal enters the locked information exchange hall.

With the technical solution provided in this embodiment of the present application, when the information about the user's information exchange is locked, locking of the information about the user's information exchange is released through an unlock server, so that it is unnecessary to execute the unlock operation through the client terminal itself, and the problem in the prior art can be avoided that the user cannot enter the information exchange hall as the client terminal cannot be normally unlocked due to occurrence of abnormality, thereby improving user experience of the information exchange operation.

Figure 3:
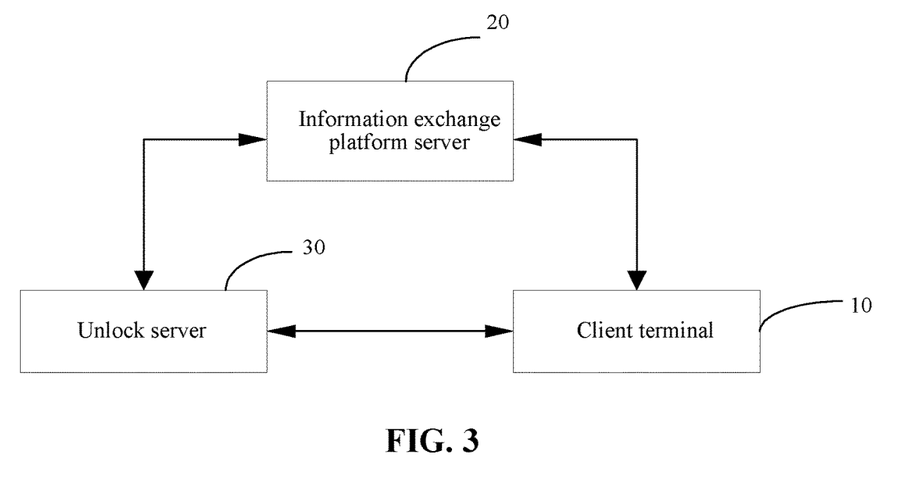
FIG. 3 is an architectural view of a communication system for unlocking user data according to an embodiment of the present application.

FIG. 3 is an architectural view of a communication system for unlocking user data according to an embodiment of the present application.

In this embodiment, a client terminal 10 establishes a communication connection with an information exchange platform server 20 via Internet, the client terminal 10 establishes a communication connection with an unlock server 30 via Internet, and the unlock server 30 establishes a communication connection with the information exchange platform server 20.

In this embodiment, a user logs on to an information exchange hall of the information exchange platform server 20 to execute an information exchange operation. In this embodiment, the client terminal 10 may be provided with information such as information exchange operation interfaces, information exchange login windows and information exchange settings, and then the user logs on to the information exchange platform server 20 according to user account and password, to enter the information exchange hall. In this process, the information exchange platform server 20 has acquired the user's any information that can validly identify his identity, including the user's instant communication number, nickname, credit and level data information; the information exchange platform server 20 then sends information about the information exchange hall to the client terminal 10, and displays the information in the information exchange hall, and at this time, the user can freely choose to enter the information exchange hall to perform an operation-related information exchange operation.

After the user enters one information exchange hall, the information exchange platform server 20 may lock information of the user's information exchange operation, and notify the client terminal 10 that the information about the user's information exchange operation has been locked currently, definitely, at this time, the information exchange platform server 20 and the client terminal 10 may respectively store lock state information of the information about the user's information exchange operation.

In this embodiment, when the user intends to enter other information exchange halls and the client terminal 10 is used for preparing to enter an information exchange hall of the information exchange platform server, detect a lock state of information about the user's information exchange operation. In this embodiment, it is feasible to query the lock state of the information about the current user's information exchange operation stored by the client terminal or to query the lock state of the information about the current user's information exchange operation stored by the information exchange platform server through the client terminal. In this embodiment, the lock state includes a locked state and a non-locked state (or idle NULL state).

When the unlock server 30 is used for querying lock information of the user when the client terminal 10 detects that the information about the user's information exchange operation is locked. In this embodiment, the client terminal 10 first requests lock information of the current user from the unlock server 30, and the unlock server 30 queries the lock information of the current user from the information exchange platform server 20. In this embodiment, the client terminal 10 may send a request message to the unlock server 30, to request the lock information of the current user. Definitely, the request message may include the current user's account number or ID. In this embodiment, the lock information may include the information about the user's information exchange operation, and state information about an information exchange operation in the information exchange hall. In this embodiment, the state information about the information exchange operation includes an operation performing state, and a wandering state (or a bystander state, non-operating state or idle state).

When the unlock server 30 is further used for releasing locking of the information about the user's information exchange operation when determining according to the lock information of the user that the user is not in the operation performing state. In this embodiment, the first circumstance: the unlock server 30 is specifically used for pushing the queried lock information of the current user to the client terminal 10 when determining that the current user is not in the operation performing state, so that the client terminal 10 determines whether the current user agrees to be unlocked; the second circumstance: the unlock server 30 is specifically used for pushing the queried lock information of the current user to the client terminal 10 when determining that the current user is in the operation performing state, so that the client terminal 10 determines whether the current user agrees to enter the locked information exchange hall.

In this embodiment, with respect to the first circumstance: the unlock server 30 is further used for releasing locking of information about the current user's information exchange operation when the client terminal 10 determines that the current user agrees to be unlocked. In this embodiment, the operation of releasing locking of the information about the user's information exchange operation may mean eliminating the user from the original information exchange hall in the information exchange platform server 20, thereby achieving releasing locking of information about the information exchange hall, credit information, experience information, and level data of the information exchange operation. In this embodiment, when the client terminal 10 determines that the current user agrees to be unlocked, the client terminal 10 sends an instruction of agreeing to be unlocked to the unlock server 30, the unlock server 30 sends an instruction of eliminating the information exchange hall of the current user to the information exchange platform server 20, the information exchange platform server 20 releases locking of the information exchange hall of the current user, and as the locking of the information exchange hall of the current user has been released, the locking of the credit information, experience information and level data are also naturally released. At this time, the client terminal 10 may enter the information exchange hall of the information exchange platform server.

With respect to the second circumstance: when the client terminal 10 determines that the current user disagrees to enter the locked information exchange hall, the client terminal 10 cancels the operation of entering the information exchange hall; when the client terminal 10 determines that the current user agrees to enter the locked information exchange hall, the client terminal 10 can enter the locked information exchange hall.

With the technical solution provided in this embodiment of the present application, when the information about the user's information exchange is locked, locking of the information about the user's information exchange is released through an unlock server, so that it is unnecessary to execute the unlock operation through the client terminal itself, and the problem in the prior art can be avoided that the user cannot enter the information exchange hall as the client terminal cannot be normally unlocked due to occurrence of abnormality, thereby improving user experience of the information exchange operation.

Figure 4:
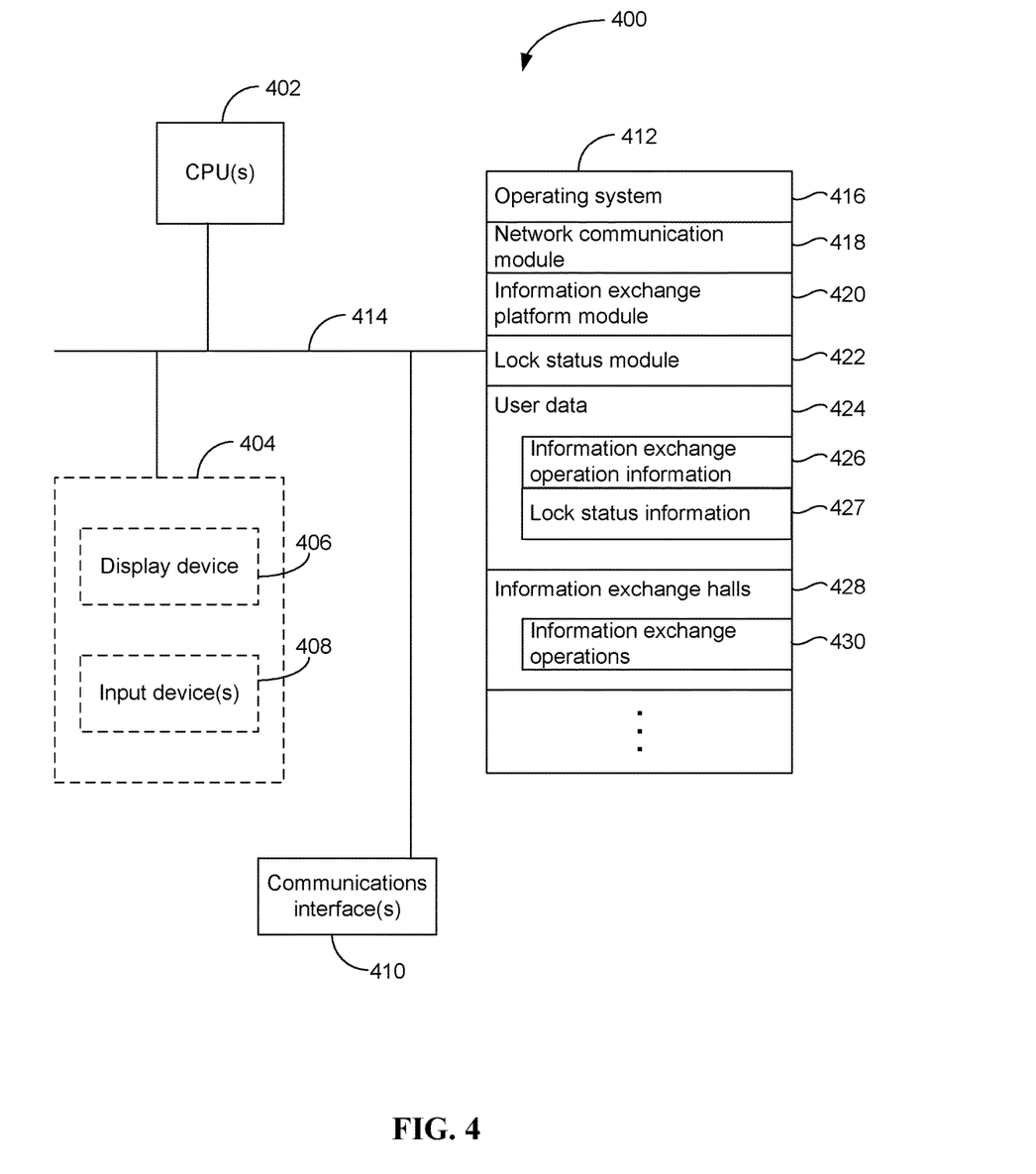
FIG. 4 is a block diagram illustrating a server in accordance with some embodiments.

FIG. 4 is a block diagram illustrating a server 400 in accordance with some embodiments. The server 400 typically includes one or more processing units (CPU's) 402 for executing modules, programs and/or instructions stored in memory 412 and thereby performing processing operations; one or more network or other communications interfaces 410; memory 412; and one or more communication buses 414 for interconnecting these components. The communication buses 414 optionally include circuitry (sometimes called a chipset) that interconnects and controls communications between system components. The server 400 optionally includes a user interface 404 comprising a display device 406 and one or more input device(s) (e.g., keyboard, mouse, touch-sensitive surface) 408. Memory 412 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 412 may optionally include one or more storage devices remotely located from the CPU(s) 402. Memory 412, or alternately the non-volatile memory device(s) within memory 412, comprises a non-transitory computer readable storage medium. In some embodiments, memory 412, or the computer readable storage medium of memory 412 stores the following programs, modules and data structures, or a subset thereof:

an operating system 416 that includes procedures for handling various basic system services and for performing hardware dependent tasks;

a network communication module 418 that is used for connecting the server 400 to other computers via the one or more communication network interfaces 410 (wired or wireless) and one or more communication networks, such as the Internet, other wide area networks, local area networks, metropolitan area networks, and so on;

an information exchange platform module 420 for receiving and processing users requests to enter or exiting (e.g., user logins and logouts, respectively) information exchange halls 424, hosting information exchange platforms or services, processing information exchange operations, detecting operation statuses of users, and processing users' entry into and exit (or quitting) from information exchange halls 424;

a lock status module 422 for detecting and changing lock statuses of users;

user data 424 for respective users, including log-in credentials and identity information of users (not shown), respective information exchange operation information 426, and lock status information 427 of respective information exchange operation information 426; and information exchange halls 428, including respective information exchange operations 430.

In some embodiments, information exchange halls 428 are online gaming halls or rooms of an online gaming service, and the information exchange operations 430 are online gaming sessions within the online gaming halls. In some embodiments, a respective online gaming hall or room corresponds to a particular game within the online gaming service (e.g., there is a hall for chess, another hall for poker, and so on). In some other embodiments, each game within the online gaming service has multiple halls or rooms (e.g., multiple halls for chess, multiple halls for poker, and so on).

Each of the above identified elements may be stored in one or more of the previously mentioned memory devices, and corresponds to a set of instructions for performing a function described above. The above identified modules, units or programs (i.e., sets of instructions) need not be implemented as separate software programs, procedures, units or modules, and thus various subsets of these modules may be combined or otherwise re-arranged in various embodiments. In some embodiments, memory 412 may store a subset of the modules and data structures identified above. Furthermore, memory 412 may store additional modules and data structures not described above.

Although FIG. 4 shows a "server," FIG. 4 is intended more as functional description of the various features which may be present in a set of servers than as a structural schematic of the embodiments described herein. In practice, and as recognized by those of ordinary skill in the art, items shown separately could be combined and some items could be separated. For example, the features of server 400 may be divided amongst an information exchange platform server 20 and an unlock server 30 (FIG. 3).

Figure 5A:
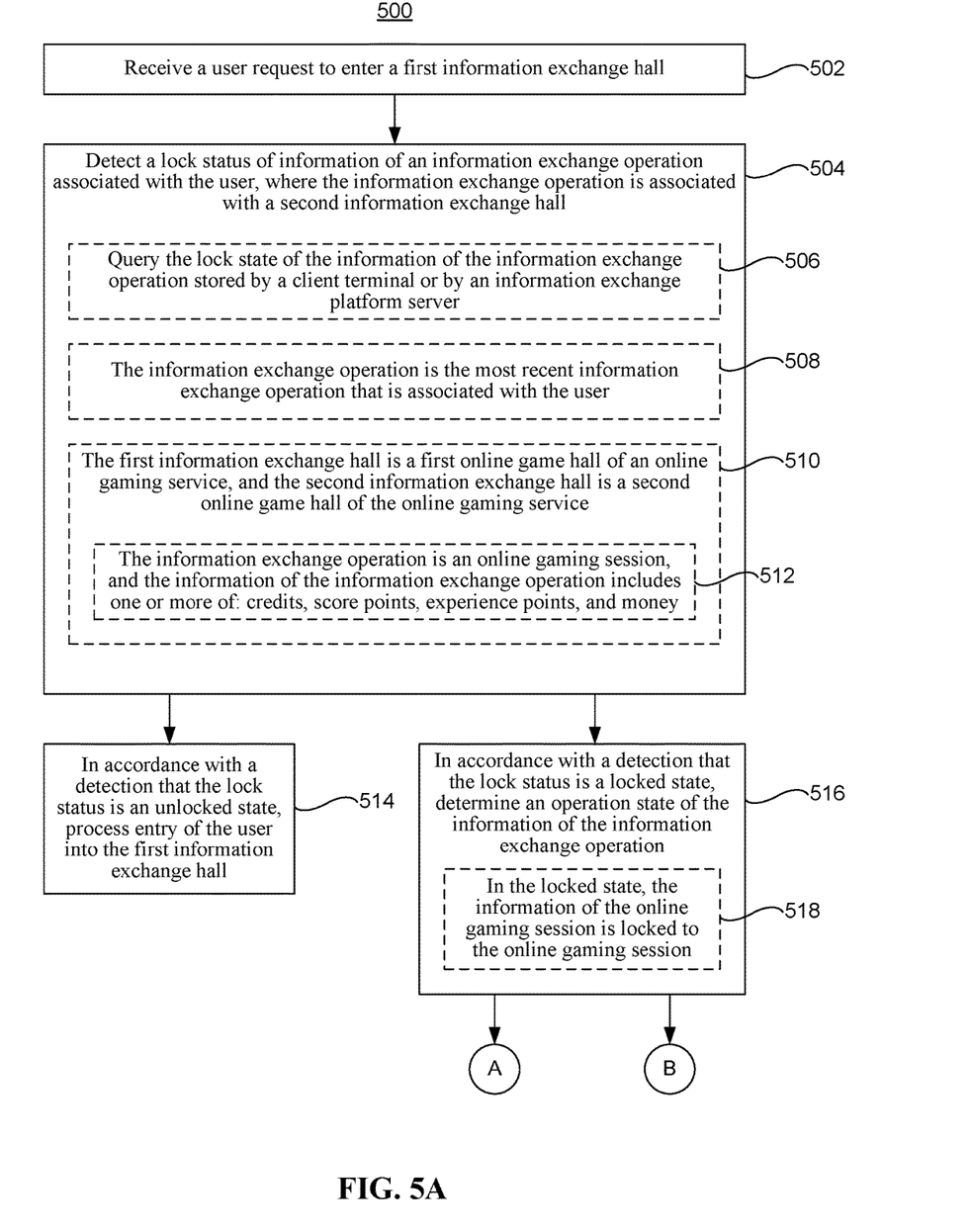
FIGS. 5A-5C illustrate a flow diagram of a method for unlocking user data in accordance with some embodiments.
Figure 5B:
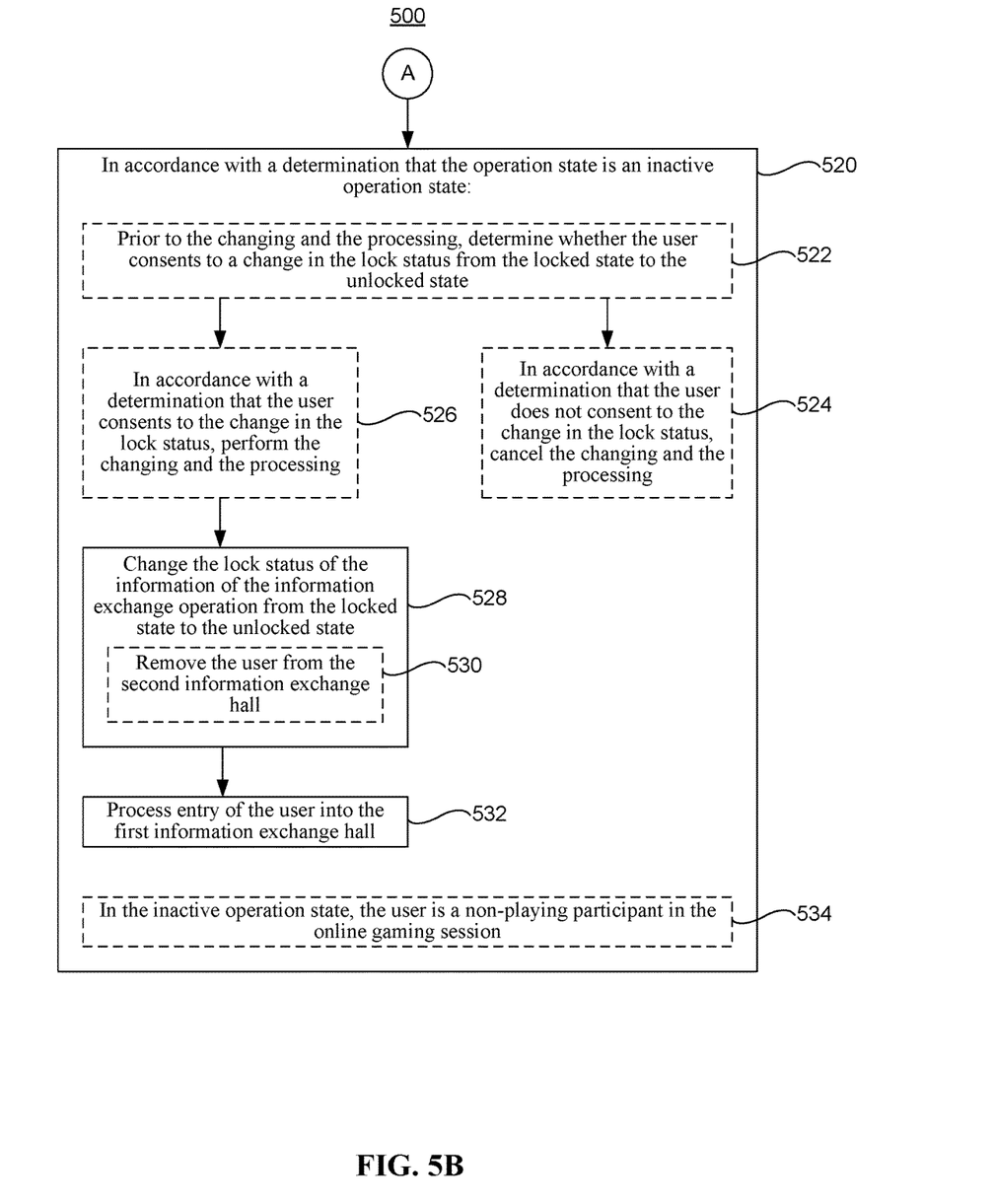
Figure 5C:
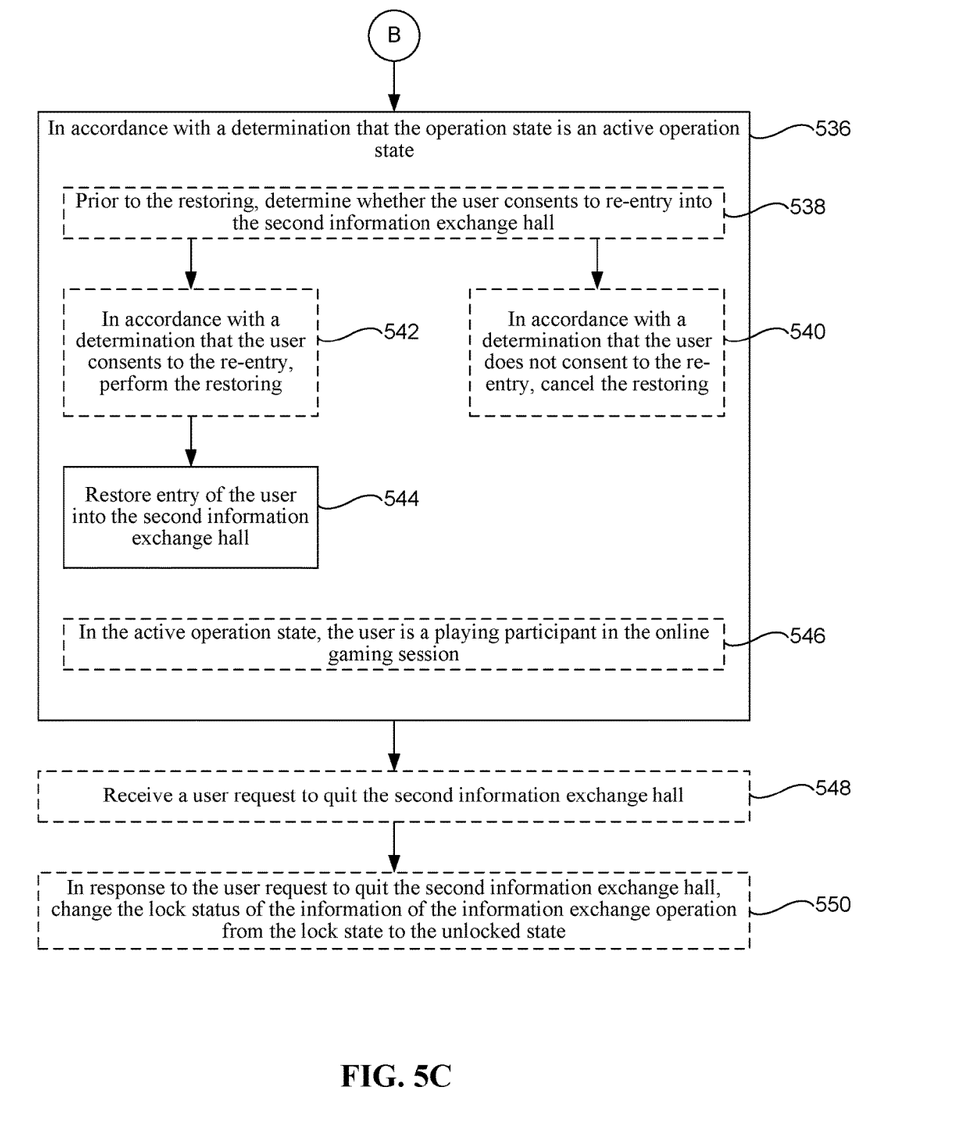

FIGS. 5A-5C illustrate a flow diagram of a method 500 for unlocking user data in accordance with some embodiments. In some embodiments, the method 500 is performed at a server system (e.g., server 400; information exchange platform server 20 and/or unlock server 30).

The server system receives (502) a user request to enter a first information exchange hall. The user at a client terminal, for example, logs into an information exchange platform or service (of which the first information exchange hall is one aspect) hosted by the server system, and then requests entry into an information exchange hall within the information exchange platform. As another example, the user logs into an information exchange hall (of an information exchange platform or service), as described above with reference to FIG. 1. The information exchange module 420 receives the login attempt and/or the entry request.

The server system detects (504) a lock status of information of an information exchange operation associated with the user. The information exchange operation is associated with a second information exchange hall. The server system (e.g., with the lock status module 422) detects if there are any information exchange operations associated with the user within the information exchange platform or service (across the information exchange halls of the platform or service), and if there are such information exchange operations, the lock status of information of these information exchange operations (e.g., as in step S301 in FIG. 2). The lock status of information of the information exchange operation is either a locked status or an unlocked status. The information exchange operation is associated with a second information exchange hall (not necessarily the same as the information exchange hall for which the user request for entry is received in step 502).

In some embodiments, when the user enters an information exchange hall, the user is associated with an information exchange operation in the information exchange hall, and information of the information exchange operation is locked to the information exchange operation and, by extension, to the information exchange hall; the information is in a locked state. In some embodiments, the information includes data that is specific to the information exchange hall and/or the information exchange operation (e.g., scores specific to the hall) and is updated by the information exchange operation. In some embodiments, the information includes data not specific to the information exchange hall and the information exchange operation (e.g., virtual currency), but is updated by the information exchange operation. Whether the information is specific to the information exchange hall/operation or not, such information (e.g., information exchange operation information 426) is associated with the user and stored with user data (e.g., user data 424) such as user login information and profile information.

In some embodiments, detecting the lock status of the information of the information exchange operation includes querying (506) the lock status of the information of the information exchange operation stored by a client terminal or by an information exchange platform server. In some embodiments, lock status information 417 is stored at the client terminal or at the server system (e.g., server 400, information exchange platform server 20). In some embodiments, the lock status module 422 queries the lock status information 427 for the lock status of the user's information exchange operation. Alternatively, lock status module 422 queries lock status information 427 stored at the client terminal from which the user is logged into. In some other embodiments, an unlock server 30 queries the lock status information stored at the client terminal or at the information exchange platform server 20.

In some embodiments, the information exchange operation is the most recent information exchange operation that is associated with the user (508). In the information exchange platform/service and the information exchange halls, a user's information for information exchange operations is locked (i.e., the lock status is a locked state) to the most recent information exchange operation for the user; the information is unlocked whenever the user ends the information exchange operation to which the information is locked or switches to a new information exchange operation. Thus, the information exchange operation from which the lock status is detected is the user's most recent information exchange operation.

In some embodiments, the first information exchange hall is a first online game hall of an online gaming service, and the second information exchange hall is a second online game hall of the online gaming service (510). In some embodiments, the information exchange platform or service is an online gaming service, and the information exchange halls are online game halls or rooms within the online gaming service. Thus, in this scenario, the user had participated in an online gaming session in the second online game hall, and is now attempting to enter the first online game hall.

In some embodiments, the information exchange operation is an online gaming session, and the information of the information exchange operation includes one or more of: credits, score points, experience points, and money (512). When the user is in an information exchange hall that is an online gaming hall, the user can participate in an online gaming session as a player or observer. The information exchange operation is the online gaming session. Information for an information exchange operation that is an online gaming session includes information that can be used in the online gaming session and is updatable by the online gaming session, such as credits, score points, experience points, and currency or money (in-game, virtual, or real).

In accordance with a detection that the lock status is an unlocked state, the server system processes (514) entry of the user into the first information exchange hall. If the detected lock status is an unlocked state, i.e., there is no locked information associated with an information exchange operation, then information exchange platform module 420 processes the user's entry into the first information exchange hall (e.g., as in step S302 in FIG. 2); the user enters the information exchange hall and can start a new information exchange operation.

In accordance with a detection that the lock status is a locked state, the server system determines (516) an operation state of the information of the information exchange operation The server system detects that there information for an information exchange operation associated with the user is in a locked state. The server system detects the locked state if the user had not ended the most recent information exchange operation due to an abnormality (e.g., the client terminal crashed before the user could end the information exchange operation). When the server system detects the locked state, the server system then determines an operation state of the information exchange operation for which the information is locked (e.g., as in step S305 in FIG. 2). For example, lock status module 422 or unlock server 30 queries for the information for the information exchange operation, which includes the operation state of the information exchange operation.

In some embodiments, in the locked state, the information of the online gaming session is locked to the online gaming session (518). When the information exchange operation is an online gaming session, when in the locked state the information (e.g., credits, experience points, etc.) is locked to the online gaming session. When the information is locked to the online gaming session, the information is updatable by the online gaming session but not other online gaming sessions.

In accordance with a determination that the operation state is an inactive operation state (520), the server system changes (528) the lock status of the information of the information exchange operation from the locked state to the unlocked state and processes (532) entry of the user into the first information exchange hall. When the information exchange operation is in an inactive operation state with respect to the user, the user is not an active participant in the operation, and thus the information can be safely unlocked without negatively affecting the information exchange operation. Thus, the server system changes (e.g., using lock status module 422, unlock server 30) the lock status to the unlocked state, unlocking the information, and processes (e.g., using information exchange platform module 420, information exchange platform server 20) entry of the user into the first information exchange hall (e.g., as in steps S309-S310 in FIG. 2). In some embodiments, changing the lock status to the unlocked state effectively ends the user's participation in the information exchange operation. In some embodiments, the inactive operation state is a wandering state, bystander state, non-operating state, or idle state.

In some embodiments, changing the lock status of the information of the information exchange operation from the locked state to the unlocked state includes removing the user from the second information exchange hall (530). When the lock state is changed to the unlocked state, the user is removed from the second information exchange hall as the information is no longer locked to the information exchange operation, and thus the user is free to exit the information exchange hall where the user participated in the information exchange operation.

In some embodiments, in accordance with a determination that the operation state is an inactive operation state (520), prior to the changing and the processing, the server system determines (522) whether the user consents to a change in the lock status from the locked state to the unlocked state. In accordance with a determination that the user consents to the change in the lock status, the server system performs (526) the changing and the processing. In accordance with a determination that the user does not consent to the change in the lock status, the server system cancels (524) the changing and the processing. When the server system determines that the operation state is an inactive operation state, before performing the changing and the processing steps, the server system prompts the user (e.g., instructs the client terminal to display a prompt) for approval to change the lock status. If the user approves (i.e., consents to the change), the server system performs the changing 528 and processing 530 steps. If the user does not approve (i.e., does not consent to the change), the server system cancels or aborts the changing 528 and processing 530 steps, and the lock status remains in the locked state. Thus, the user can cancel out of the request to enter the first information exchange hall by not approving of the change in lock status.

In some embodiments, in the inactive operation state, the user is a non-playing participant in the online gaming session (534). If the information exchange operation is an online gaming session, when the operation is in the inactive operation state with respect to the user, the user is a non-playing or non-active participant in the online gaming session. For example, the user is a bystander or observer observing the proceedings in the online gaming session but not playing in the online gaming session.

In accordance with a determination that the operation state is an active operation state (536), the server system restores (544) entry of the user into the second information exchange hall. When the information exchange operation is in an active operation state with respect to the user, the user is an active participant in the operation (e.g., with other users), and thus the information cannot safely unlocked without negatively affecting the information exchange operation. Thus, the server system (e.g., information exchange platform module 420, information exchange platform server 20) restores entry of the user into the second information exchange hall; the lock status remains in the locked state. The user re-enters the second information exchange hall so that the user can continue the information exchange operation or to unlock the information by ending active participation in the information exchange operation (e.g., by quitting the second information exchange hall).

In accordance with a determination that the operation state is an active operation state (536), prior to the restoring, the server system determines (538) whether the user consents to re-entry into the second information exchange hall. In accordance with a determination that the user consents to the re-entry, the server system performs (542) the restoring. In accordance with a determination that the user does not consent to the re-entry, the server system cancels (540) the restoring. When the server system determines that the operation state is an active operation state, before performing the restoring step, the server system prompts the user (e.g., instructs the client terminal to display a prompt) for approval to re-enter the second information exchange hall (with which the information exchange operation to which the information is locked is associated) (e.g., as in step S312 in FIG. 2). If the user approves (i.e., consents to the re-entry), the server system performs the restoring 544 step (e.g., as in step S314 in FIG. 2). If the user does not approve (i.e., does not consent to the re-entry), the server system cancels or aborts the restoring 544 (e.g., as in step S313 in FIG. 2).

In some embodiments, in the active operation state, the user is a playing participant in the online gaming session (546). If the information exchange operation is an online gaming session, when the information exchange operation is in the active operation state with respect to the user, the user is a playing participant in the online gaming session; the user is playing in the online gaming session with other users.

In some embodiments, after restoring entry of the user into the second information exchange hall, the server system receives (548) a user request to quit the second information exchange hall, and in response to the user request to quit the second information exchange hall, changes (550) the lock status of the information of the information exchange operation from the locked state to the unlocked state. After the user is restored to the second information exchange hall, the user can end the information exchange operation and unlock the information by requesting to exit or quit the second information exchange hall. In response to the request, the server system changes the lock status of the information to the unlocked state and processes the user's exit from the second information exchange hall. The user exits the second information exchange hall, and as a result is able to enter other information exchange halls.

With the technical solution provided in this embodiment of the present application, when the information about the user's information exchange is locked, locking of the information about the user's information exchange is released through a server system, so that it is unnecessary to execute the unlock operation through the client terminal itself, and the problem in the prior art can be avoided that the user cannot enter the information exchange hall as the client terminal cannot be normally unlocked due to occurrence of abnormality, thereby improving user experience of the information exchange operation.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present application. First ranking criteria and second ranking criteria are both ranking criteria, but they are not the same ranking criteria.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain principles of the invention and its practical applications, to thereby enable others skilled in the art to best utilize the invention and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A method, comprising:
   at a server system:
   receiving, from a client terminal, a request for a user of the client terminal to enter a first information exchange hall, wherein:
   the client terminal submits the request after recovering from an occurrence of an abnormality caused by a system crash at the client terminal,
   the system crash occurred while the user of the client terminal was in a second information exchange hall that is distinct from the first information exchange hall, and
   an information exchange operation associated with the user was executed at the second information exchange hall;
   in response to the request for the user to enter the first information exchange hall:
   detecting a lock status of predefined information of the information exchange operation that is associated with the user and the second information hall;
   in accordance with a detection that the lock status of the predefined information that is associated with the user and the second information exchange hall is a locked state, determining an operation state of the information exchange operation that was executed at the second information exchange hall;
   in accordance with a determination that the operation state of the information exchange operation that was executed at the second information exchange hall is a predefined inactive operation state:
   changing the lock status of the predefined information of the information exchange operation that is associated with the user and the second information exchange hall from the locked state to the unlocked state; and
   processing entry of the user into the first information exchange hall; and
   in accordance with a determination that the operation state of the information exchange operation that was executed at the second information exchange hall is a predefined active operation state, initiating a process to restore entry of the user into the second information exchange hall.

2. The method of claim 1, wherein detecting the lock status of the predefined information of the information exchange operation that is associated with the user and the second information exchange hall includes:
   querying the client terminal regarding the lock status of the predefined information of the information exchange operation that is associated with the user and the second information exchange hall stored by the client terminal.

3. The method of claim 1, wherein changing the lock status of the predefined information of the information exchange operation that is associated with the user and the second information exchange hall from the locked state to the unlocked state includes:
   removing the user from the second information exchange hall.

4. The method of claim 1, wherein the information exchange operation that is associated with the user and the second information exchange hall is the most recent information exchange operation that is associated with the user prior to the occurrence of the abnormality at the client terminal.

5. The method of claim 1, wherein:
the first information exchange hall is a first online game hall of an online gaming service,
the second information exchange hall is a second online game hall of the online gaming service,
the information exchange operation is an online gaming session, and
the predefined information of the information exchange operation includes one or more of: credits, score points, experience points, or game assets.

6. The method of claim 5, wherein, in the predefined inactive operation state, the user is a non-playing participant in the online gaming session.

7. The method of claim 1, including:
in accordance with the determination that the operation state of the information exchange operation that was executed at the second information exchange hall is a predefined inactive operation state:
prior to the changing and the processing, requesting user consent for changing in the lock status of the information exchange operation that was executed at the second information exchange hall from the locked state to the unlocked state.

8. A computer system, comprising:
memory;
one or more processors; and
one or more programs, wherein the one or more programs are stored in the memory and configured to be executed by the one or more processors, the one or more programs including instructions, which when executed by the one or more processors, cause the processors to perform operations including:
receiving, from a client terminal, a request for a user of the client terminal to enter a first information exchange hall, wherein:
the client terminal submits the request after recovering from an occurrence of an abnormality caused by a system crash at the client terminal,
the system crash occurred while the user of the client terminal was in a second information exchange hall that is distinct from the first information exchange hall, and
an information exchange operation associated with the user was executed at the second information exchange hall;
in response to the request for the user to enter the first information exchange hall:
detecting a lock status of predefined information of the information exchange operation that is associated with the user and the second information hall;
in accordance with a detection that the lock status of the predefined information that is associated with the user and the second information exchange hall is a locked state, determining an operation state of the information exchange operation that was executed at the second information exchange hall;
in accordance with a determination that the operation state of the information exchange operation that was executed at the second information exchange hall is a predefined inactive operation state:
changing the lock status of the predefined information of the information exchange operation that is associated with the user and the second information exchange hall from the locked state to the unlocked state; and
processing entry of the user into the first information exchange hall; and
in accordance with a determination that the operation state of the information exchange operation that was executed at the second information exchange hall is a predefined active operation state, initiating a process to restore entry of the user into the second information exchange hall.

9. The computer system of claim 8, wherein detecting the lock status of the predefined information of the information exchange operation that is associated with the user and the second information exchange hall includes:
querying the client terminal regarding the lock status of the predefined information of the information exchange operation that is associated with the user and the second information exchange hall stored by the client terminal.

10. The computer system of claim 8, wherein changing the lock status of the predefined information of the information exchange operation that is associated with the user and the second information exchange hall from the locked state to the unlocked state includes:
removing the user from the second information exchange hall.

11. The computer system of claim 8, wherein the information exchange operation that is associated with the user and the second information exchange hall is the most recent information exchange operation that is associated with the user prior to the occurrence of the abnormality at the client terminal.

12. The computer system of claim 8, wherein:
the first information exchange hall is a first online game hall of an online gaming service,
the second information exchange hall is a second online game hall of the online gaming service,
the information exchange operation is an online gaming session, and
the predefined information of the information exchange operation includes one or more of: credits, score points, experience points, or game assets.

13. The computer system of claim 12, wherein, in the predefined inactive operation state, the user is a non-playing participant in the online gaming session.

14. The computer system of claim 8, wherein the operations include:
in accordance with the determination that the operation state of the information exchange operation that was executed at the second information exchange hall is a predefined inactive operation state:
prior to the changing and the processing, requesting user consent for changing in the lock status of the information exchange operation that was executed at the second information exchange hall from the locked state to the unlocked state.

15. A non-transitory computer readable storage medium storing one or more programs, the one or more programs comprising instructions, which when executed by a server, cause the server to perform operations comprising:
receiving, from a client terminal, a request for a user of the client terminal to enter a first information exchange hall, wherein:
the client terminal submits the request after recovering from an occurrence of an abnormality caused by a system crash at the client terminal, the system crash occurred while the user of the client terminal was in a second information exchange hall that is distinct from the first information exchange hall, and an information exchange operation associated with the user was executed at the second information exchange hall;

in response to the request for the user to enter the first information exchange hall:

detecting a lock status of predefined information of the information exchange operation that is associated with the user and the second information hall;

in accordance with a detection that the lock status of the predefined information that is associated with the user and the second information exchange hall is a locked state, determining an operation state of the information exchange operation that was executed at the second information exchange hall;

in accordance with a determination that the operation state of the information exchange operation that was executed at the second information exchange hall is a predefined inactive operation state:

changing the lock status of the predefined information of the information exchange operation that is associated with the user and the second information exchange hall from the locked state to the unlocked state; and processing entry of the user into the first information exchange hall; and in accordance with a determination that the operation state of the information exchange operation that was executed at the second information exchange hall is a predefined active operation state, initiating a process to restore entry of the user into the second information exchange hall.

16. The computer-readable storage medium of claim 15, wherein detecting the lock status of the predefined information of the information exchange operation that is associated with the user and the second information exchange hall includes:

querying the client terminal regarding the lock status of the predefined information of the information exchange operation that is associated with the user and the second information exchange hall stored by the client terminal.

17. The computer-readable storage medium of claim 15, wherein changing the lock status of the predefined information of the information exchange operation that is associated with the user and the second information exchange hall from the locked state to the unlocked state includes:

removing the user from the second information exchange hall.

18. The computer-readable storage medium of claim 15, wherein the information exchange operation that is associated with the user and the second information exchange hall is the most recent information exchange operation that is associated with the user prior to the occurrence of the abnormality at the client terminal.

19. The computer-readable storage medium of claim 15, wherein:

the first information exchange hall is a first online game hall of an online gaming service, the second information exchange hall is a second online game hall of the online gaming service, the information exchange operation is an online gaming session, and the predefined information of the information exchange operation includes one or more of: credits, score points, experience points, or game assets.

20. The computer-readable storage medium of claim 19, wherein, in the predefined inactive operation state, the user is a non-playing participant in the online gaming session.

* * * * *